Patented Dec. 4, 1951

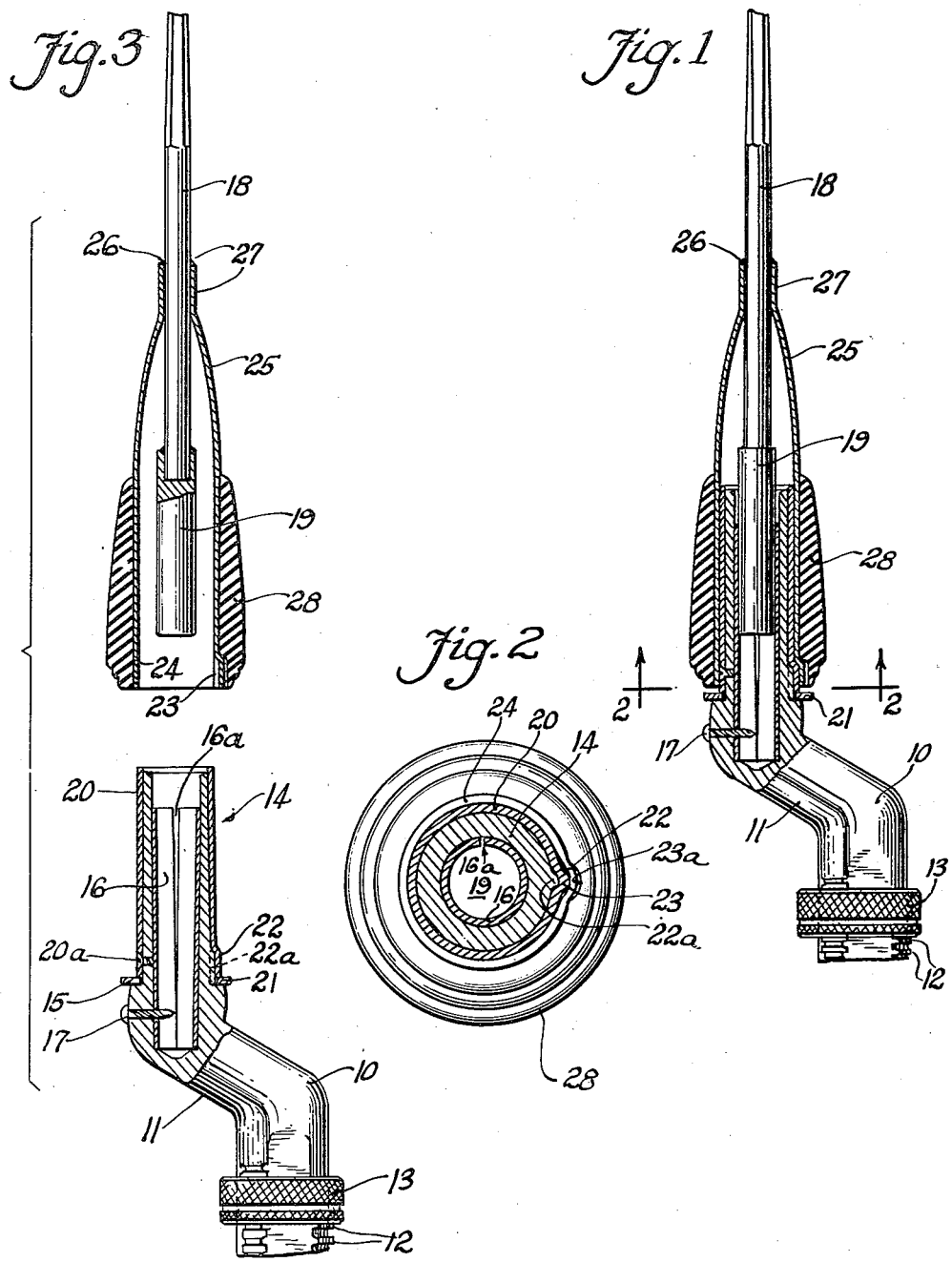

2,577,575

UNITED STATES PATENT OFFICE 2,577,575

FISHING ROD

Harry M. Gephart, Elmhurst, Ill., assignor to Gephart Manufacturing Company, Chicago, Ill., a corporation of Illinois Application July 13, 1948, Serial No. 38,449

1 Claim. (Cl. 43—23)

This invention relates generally to fishing rods and more specifically to an improvement in fishing rods of the type forming the subject of Patent No. 2,005,081 issued on June 18, 1935.

One of the important features of the rod disclosed in my above mentioned patent is that a forward gripping element is permanently mounted at the rear end of the rod portion to facilitate assembly and dis-assembly of the rod and handle portions. However, one disadvantage has been experienced with this type of rod in that, when it is dis-assembled, there is nothing to prevent loss of the reel locknut over the forward end of the handle portion. The consequences of such loss, as when the locknut is irretrievably dropped overboard at the beginning of a fishing trip, can be quite serious and can result in considerable loss of customer good will.

Accordingly, a primary object of the present invention is the provision of a retainer which will be effective to hold the reel lock in place even when the handle and rod carrying the gripping element are dis-assembled.

Another object of the present invention is the provision of a locknut retainer which comprises a separate member permanently assembled upon the handle, as for example by merely pressing it in place after the locknut is in place. This construction avoids the expense that would otherwise be involved if it were necessary to conduct an additional forming operation on the handle after the locknut is in place to provide an integral retaining flange thereon.

Another disadvantage of the rod shown in the patent which has developed in use is that the forward gripping element carried by the rod portion is abuttable by the locknut when the latter is loose and, since the gripping element is often made of plastics, cork or some such easily abradable material, the end of it becomes deteriorated in time by the locknut repeatedly striking it when loose.

It is therefore another object of the present invention to provide a member permanently attached to the handle which serves the dual purpose of preventing loss of the locknut when the rod portion is removed and also protecting the gripping element from abrasion by the loose locknut.

A further object of the present invention is to provide improved means permitting limited rotation of the rod with respect to the handle to facilitate dis-assembly, yet which maintains the rod and handle within a predetermined degree of angular alignment.

Other objects and advantages will be apparent from the following description taken in connection with the drawings in which:

Figure 1 is a longitudinal sectional view of a fishing rod illustrating the principles of the present invention and showing the handle and rod portions in assembled relation;

Fig. 2 is an enlarged sectional view of Fig. 1, taken along the line 2—2 of Fig. 1; and Fig. 3 is a view similar to Fig. 1, showing the parts in dis-assembled relation.

Referring now more particularly to the drawing, the numeral 10 designates generally the handle of a fishing rod having an offset or recessed portion 11 provided with threads 12 on which a locknut 13 is threaded for securing a fishing reel (not shown) to the handle.

The forward end 14 of the handle is reduced exteriorly to any desired extent to form a circumferential shoulder 15 and there is provided a tubular lining 16 within the end 14 of the handle. As shown in Fig. 2, the lining 16 is of discontinuous, annular cross section formed with a longitudinally extending slot 16a; it is biased inwardly to frictionally grip the end of the rod assembly to be described. A rivet 17 extending through the handle 14 serves to anchor the lining 16 in place.

The numeral 18 designates one of the fishing rod sections and, secured to the rear end of the rod, there is an extension 19 of enlarged diameter which normally fits within, and is frictionally gripped by, the lining 16. If it is desired to increase this frictional grip, this can be done simply by withdrawing rivet 17, removing the lining 16, and contracting the latter, as for example in a vise, to increase the inward bias. The numeral 24 designates generally a ferrule, apron or skirt of tubular configuration open at the rear (that is, at the bottom in the drawing) and provided with a tapered forward portion 25. This tapered portion gradually decreases in internal diameter to the extremity 26 adjacent which is a cylindrical portion 27 of substantial length so as to fit and closely hug the rod 18. The ferrule is secured to the rod section 18 in any suitable manner such as by means of solder, brazing, or in any other manner suitable for the purpose, and the internal diameter of the body portion of the ferrule is somewhat greater than the external diameter of the reduced portion 14 of the handle 10 so as to fit telescopically over the outside of a tubular bushing 20 which is mounted on the handle end 14 and held in place by rivet 20a. The ferrule 24 also is of considerably greater diameter than the external diameter of the extension 19 on rod 18.

The rear end portion of the bushing 20 is formed with an upstanding, longitudinally extending rib 22 (formed over a similar rib 22a on the end portion 14 of the handle) which, when the parts are assembled, fits within a suitably formed grooved portion 23 struck outward from the ferrule 24, said groove being pressed at least part way into the relief groove 23a in the gripping member 28. The rib and groove 23 are so positioned on their respective parts that they will prevent relative rotation between the rod and handle beyond a range of preferred positions.

One of the important features of the present invention resides in the retainer means provided for retaining the locknut 13 on the handle 10 after the rod 18 has been removed therefrom, as in Fig. 3. This retainer means in the present instance comprises a flange or washer 21 which is fitted over the reduced portion of the end 14 and seated against shoulder 15. The bushing 20, above mentioned, is mounted on the outside of the end 14 just ahead of the retainer and is effective to prevent loss of the locknut when the latter is loose. The bushing 20 will be maintained permanently thereon in any preferred way, as for example by brazing, soldering, riveting or merely by a force fit. The hand grip 28 (above mentioned) is here shown as constructed of cork or similar material which is sleeved upon the end of the ferrule 24 and is secured thereto as by the use of adhesive means. This grip 28 is adapted to be grasped by the operator when it is desired to press the rod into the handle or to detach those two members from one another, all as described in my above-mentioned patent. It also provides a convenient means of holding the rod while turning the reel.

It will be apparent that the retainer 21 will serve the dual function of: (a) preventing loss of the locknut 13 when the rod 18 is removed and, (b) preventing the locknut 13, when loose, from impinging upon the end of the cork grip 28 and abrading the latter.

It will be seen that the groove 23a in the grip 28 provides a relief into which the rib 22 can press the formation 23 of ferrule 24 when the handle and rod are telescoped together, as shown in Fig. 2. The resilience of the ferrule 24 will urge it inwardly against the rib 22 thereby providing additional friction to hold the rod and handle together. The engagement of the rib within the indentation in the ferrule in this manner will tend to prevent the relative rotation of the rod and handle; however, it will not prevent this rotation entirely since, due to the resilience of the ferrule 24 and grip 28 and due to the proportioning of the rib 22 and grooves 23 and 23a, a limited amount of relative movement (preferably about 10 degrees) is provided.

Thus, when the rod and handle are pulled apart, if they also are turned back and forth relative to one another, they will come apart with no difficulty whatsoever, as contrasted with the tremendous force that often needs to be applied in a straight pull to free the handle and rod in conventional rod assemblies. The grip necessary to provide this turning movement is made possible by member 28 which, as above stated, comprises a permanent part of the rod.

While a particular form of the present invention has been shown, it will be apparent that minor changes therein will readily suggest themselves to others skilled in the art without departing from the spirit and scope of the invention. For example, while the washer 21 and tubular bushing 20 have been illustrated as two separate parts, they may satisfactorily be made integral, if desired.

I claim:

In a fishing rod assembly wherein a tubular end portion of a handle is telescopingly engageable in and separable from a resilient ferrule secured on an end portion of a rod and carrying a surrounding hand-grip member to facilitate assembling and separating said assembly, the improvement comprising a rib extending axially along and projecting radially outwardly from the tubular end portion of said handle, an open end portion of said resilient ferrule adapted frictionally to engage about said tubular end portion and having a deformity providing a groove and a rib both extending axially along and projecting radially outwardly from the inner and outer surfaces of said open end portion, respectively, said groove being adapted to receive therein the rib of said tubular end portion and being slightly wider than the last said rib to permit slight relative rotation between said ferrule and said tubular end portion when they are in telescoping engagement to facilitate separating the handle from the rod, and said hand grip member having an axially extending groove at its inner surface registering with the rib of said open end portion and into which the last said rib extends when said ferrule and tubular end portion are in telescoping engagement and the rib of the latter is in the groove of said ferrule.

HARRY M. GEPHART.

REFERENCES CITED

The following references are of record in the file of this patent:

UNITED STATES PATENTS

| Number | Name | Date |
| --- | --- | --- |
| 1,641,226 | Kinnear | Sept. 6, 1927 |
| 2,005,081 | Gephart | June 18, 1935 |
| 2,315,539 | Nelson | Apr. 6, 1943 |
| 2,400,007 | Kiest | May 7, 1946 |
| 2,409,940 | Kay | Oct. 22, 1946 |
| 2,466,372 | Byrd | Apr. 5, 1949 |